US 10,079,529 B2

United States Patent
Masubuchi et al.

(10) Patent No.: US 10,079,529 B2
(45) Date of Patent: Sep. 18, 2018

(54) METHOD FOR MANUFACTURING CORE OF ROTATING ELECTRIC MACHINE

(71) Applicant: TOYOTA BOSHOKU KABUSHIKI KAISHA, Aichi-ken (JP)

(72) Inventors: Yoshiaki Masubuchi, Okazaki (JP); Masaki Sugiyama, Okazaki (JP); Masaaki Takemoto, Toyokawa (JP); Masayuki Kito, Okazaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 259 days.

(21) Appl. No.: 14/967,722

(22) Filed: Dec. 14, 2015

(65) Prior Publication Data

US 2016/0181896 A1    Jun. 23, 2016

(30) Foreign Application Priority Data

Dec. 19, 2014 (JP) .................................. 2014-257654

(51) Int. Cl.
*H02K 15/03* (2006.01)
*H02K 1/27* (2006.01)
*H02K 15/12* (2006.01)

(52) U.S. Cl.
CPC ........... *H02K 15/03* (2013.01); *H02K 1/2766* (2013.01); *H02K 15/12* (2013.01)

(58) Field of Classification Search
CPC ....... H02K 15/03; H02K 15/12; H02K 1/2766
See application file for complete search history.

(56) References Cited

U.S. PATENT DOCUMENTS

| 6,075,304 | A | 6/2000 | Nakatsuka |
| 9,997,968 | B2* | 6/2018 | Kitada ................ C08G 59/621 |
| 2002/0013424 | A1 | 1/2002 | Soelch |
| 2011/0000079 | A1 | 1/2011 | Fukumaru et al. |
| 2012/0139378 | A1 | 6/2012 | Endo |
| 2013/0257190 | A1* | 10/2013 | Hamer ..................... H02K 9/22 310/52 |
| 2013/0334910 | A1* | 12/2013 | Takahashi ................ H02K 9/22 310/52 |

(Continued)

FOREIGN PATENT DOCUMENTS

| CN | 1296508 | 5/2001 |
| CN | 101379682 | 3/2009 |

(Continued)

OTHER PUBLICATIONS

Office Action issued in Germany Counterpart Patent Appl. No. 102015121855.0, dated Sep. 12, 2016.

(Continued)

*Primary Examiner* — Minh Trinh
(74) *Attorney, Agent, or Firm* — Greenblum & Bernstein, P.L.C.

(57) ABSTRACT

A method for manufacturing a core of a rotating electric machine includes arranging a permanent magnet in a receptacle of a core body and injecting an anchoring material into a gap between a wall surface of the receptacle and an outer surface of the permanent magnet. A liquid crystal polymer, more specifically, liquid crystal polyester is used as the anchoring material. The liquid crystal polymer is injected at a velocity of 100 to 300 millimeters per second.

3 Claims, 5 Drawing Sheets

(56) References Cited

U.S. PATENT DOCUMENTS

2014/0327329 A1* 11/2014 Kitada ................. C08G 59/621
                                                              310/43
2014/0375165 A1* 12/2014 Masubuchi ............ H02K 15/03
                                                              310/156.53

FOREIGN PATENT DOCUMENTS

| CN | 102668343    | 9/2012  |
|----|--------------|---------|
| JP | 9-92668      | 4/1997  |
| JP | 2005-192264  | 7/2005  |
| JP | 2007-318942  | 12/2007 |
| JP | 2010-141989  | 6/2010  |
| JP | 2011-091913  | 5/2011  |
| JP | 2013-136725  | 7/2013  |
| JP | 2013-183527  | 9/2013  |

OTHER PUBLICATIONS

Office Action issued in China Counterpart Patent Appl. No. 201510945373.0, dated Oct. 30, 2017 , along with an English translation thereof.
Office Action issued in Japan Counterpart Patent Appl. No. 2014-257654, dated Feb. 27, 2018, along with English-language translation.

* cited by examiner

METHOD FOR MANUFACTURING CORE OF ROTATING ELECTRIC MACHINE

BACKGROUND ART

The present invention relates to a method for manufacturing a core, such as a rotor core, of a rotating electric machine, such as a motor.

FIG. 8 shows a known structure of a rotor core for a motor. In this structure, a rotor core body 31 includes receptacles 32 arranged along the peripheral portion of the rotor core body 31. Each receptacle 32 accommodates a permanent magnet 33. An anchoring material 34 is injected into the gap between the wall surface of each receptacle 32 and the outer surface of the corresponding permanent magnet 33 to anchor the permanent magnet 33 to the receptacle 32. Generally, an epoxy resin that is a thermosetting resin is used as the anchoring material 34.

In the prior art, the rotor core is manufactured through the steps shown in FIG. 9.

In a first step 35, core plates, which are pressed out of a metal plate, are stacked to form the rotor core body 31. In a second step 36, the permanent magnet 33 is inserted into and accommodated in each receptacle 32 of the rotor core body 31. In a third step 37, the rotor core body 31, which accommodates the permanent magnets 33, is heated to approximately 150° C. with a heating furnace or the like. Since an epoxy resin, which is a thermosetting resin, is used as the anchoring material 34 that anchors the accommodated permanent magnets 33, the rotor core body 31 and the permanent magnets 33 need to be preheated prior to the injection of the anchoring material 34.

When the rotor core body 31 and the permanent magnets 33 have been heated, in a fourth step 38, the anchoring material 34 is molten and injected into the gap between the wall surface of each receptacle 32 and the outer surface of the corresponding permanent magnet 33 using a molding tool. The anchoring material 34 is thermally cured to anchor each permanent magnet 33 in the corresponding receptacle 32. In a fifth step 39, the rotor core, which has the permanent magnets 33 accommodated and anchored in the receptacles 32, is cooled to room temperature by a cooling unit or the like.

The first to fifth steps manufacture the rotor core. Subsequently, the rotor core undergoes various steps such as the coupling of a rotor shaft to the rotor core.

Japanese Laid-Open Patent Publication Nos. 2013-136725 and 2013-183527 disclose the use of a thermosetting resin such as an epoxy resin as the anchoring material that fixes the magnets in the receptacles.

In Japanese Laid-Open Patent Publication No. 2010-141989, a thermosetting resin is not used. Each receptacle accommodates a plurality of permanent magnets. A resin foam sheet is arranged between the permanent magnets and expanded to press the permanent magnets against the wall surface of the corresponding receptacle. This anchors the permanent magnets to the rotor core body.

In Japanese Laid-Open Patent Publication No. 2005-192264, a thermosetting resin is not used. Instead, a thermoplastic resin, which is formed of a liquid crystal polymer (LCP), is molded to anchor permanent magnets to magnet embedment portions.

The general prior art and Japanese Laid-Open Patent Publication Nos. 2013-136725 and 2013-183527 described above use a thermosetting resin as the anchoring material. The thermosetting resin is injected into the receptacles of the rotor core body, which is heated to 150 degrees Celsius. Thus, a large amount of energy is used to heat the rotor core body, and the time used for heating and cooling lengthens the cycle time. Further, the thermal curing of the thermosetting resin is a chemical reaction. Thus, it takes time for the curing to be completed. Consequently, the use of a thermosetting resin as the anchoring material decreases the manufacturing efficiency of the rotor core.

The characteristics of the permanent magnets 33 are in that each permanent magnet 33 expands along an axis that is orthogonal to the axis of easy magnetization when the temperature decreases and contracts along the axis orthogonal to the axis of easy magnetization when the temperature increases. Thus, when the rotor core body 31 is heated, the rotor core body 31 expands while the permanent magnets 33 contract. This expands the gap between the wall surface of each receptacle 32 and the corresponding permanent magnet 33. The thermosetting resin is injected into the expanded gap. When the rotor core body 31 is cooled after the thermosetting resin is injected into the gap, the rotor core body 31 contracts and the permanent magnets 33 expand as shown by the arrows in FIG. 8. Thus, the cured thermosetting resin deforms the rotor core body 31. In particular, thin portions 311 of the rotor core body 31 may be greatly deformed toward the outer circumference of the rotor core body 31. This will vary the clearance between the rotor core body 31 and a stator, which is located at the outer side of the rotor core body 31, from the predetermined size and adversely affect the performance of the rotating electric machine.

Further, the epoxy resin that forms the anchoring material has poor ductility. Thus, cracks may form in the epoxy resin, or the anchoring material, when the epoxy resin is squeezed by the contraction of the rotor core body 31 and the expansion of the permanent magnets 33 and when the epoxy resin receives a heat shock or physical stress during use of the rotor core as a rotating electric machine. To prevent scattering of the cracked anchoring material, a cover may need to be arranged beside the rotor core body. This increases the size and weight of the rotor and lowers the operation efficiency of the rotating electric machine.

To shorten the time for injecting the thermosetting resin into the gaps, an injection nozzle of a molding tool may be increased in diameter. However, this increases the torque required to separate the molded product from the thermosetting resin in the nozzle after the thermosetting resin is cured. Thus, it becomes difficult to break away the thermosetting resin at the nozzle. In addition, the time required for the thermosetting resin to cure at the nozzle increases as the diameter of the injection nozzle increases.

This lengthens the cycle time for manufacturing the rotor core. This also increases the amount of thermosetting resin cull that is disposed of and increases the ratio of material loss.

Japanese Laid-Out Patent Publication No. 2010-141989 does not use a thermosetting resin. Thus, problems caused by the use of a thermosetting resin do not occur. However, in Japanese Laid-Out Patent Publication No. 2010-141989, the expansion pressure of the foam resin is used to anchor the permanent magnets. Thus, the permanent magnets are strongly pressed against the wall surfaces of the receptacles. The expansion amount of the foam resin, which is affected by the foams, is larger than the expansion amount of a thermosetting resin. Thus, the rotor core body deforms more easily than when using a thermosetting resin as the anchoring material. This may adversely affect the performance of the rotating electric machine.

Japanese Laid-Out Patent Publication No. 2005-192264 discloses the use of a thermoplastic resin, which is formed of LCP, instead of a thermosetting resin to anchor the permanent magnets. However, the conditions related to LCP are not disclosed.

SUMMARY OF THE INVENTION

It is an object of the present invention to provide a method for manufacturing a core of a rotating electric machine that simplifies the process for manufacturing a core and reduces deformation of the core.

To achieve the above object, the present invention provides a method for manufacturing a core of a rotating electric machine. The method includes arranging a permanent magnet in a receptacle of a core body and injecting an anchoring material into a gap between a wall surface of the receptacle and an outer surface of the permanent magnet. A liquid crystal polymer is used as the anchoring material. The liquid crystal polymer is injected at a velocity of 100 to 300 millimeters per second.

In the manufacturing method described above, before injection of the anchoring material, there is no need to heat the core body and the permanent magnet to a high temperature or cool the heated core body and permanent magnet. This simplifies the manufacturing of the core and reduces energy loss. Further, temperature changes are small in the core body and the permanent magnet. Thus, expansion and contraction of the core body and the permanent magnet rarely occur. This reduces deformation of the core and obtains the core with high precision.

DETAILED DESCRIPTION OF THE INVENTION

One embodiment of the present invention will now be described with reference to the drawings.

Structure of Rotor Core 10

Figure 1:
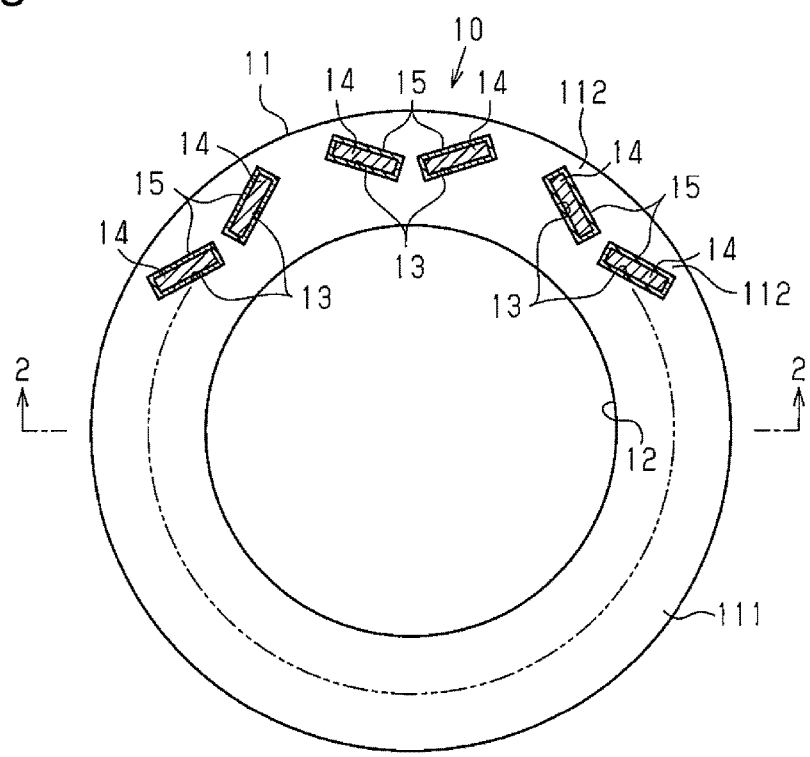
FIG. 1 is a plan view showing a rotor core that is manufactured in one embodiment of a manufacturing method.
Figure 2:
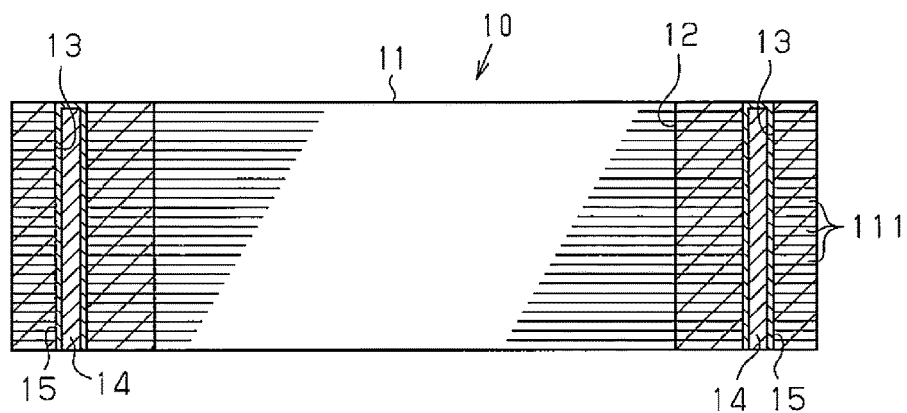
FIG. 2 is a cross-sectional view taken along line 2-2 in FIG. 1.

Referring to FIGS. 1 and 2, a rotor core 10 includes a rotor core body (hereafter referred to as the core body 11) formed by stacking core plates 111. The central portion of the core body 11 includes a shaft hole 12 that receives a rotor shaft (not shown). The peripheral portion of the core body 11 includes receptacles 13 that are oblong in a plane view. Each receptacle 13 is paired with an adjacent receptacle 13. Each receptacle 13 accommodates a plate-shaped permanent magnet 14. The permanent magnet 14 extends in the stacking direction of the core plates 111.

An anchoring material 15 is injected into the gap between the wall of each receptacle 13 and the outer surface of the corresponding permanent magnet 14. A liquid crystal polymer (LCP), more specifically, liquid crystal polyester, is used as the anchoring material 15. Liquid crystal polymer is a thermoplastic resin that can be solidified under room temperature. The liquid crystal polyester may be a known aromatic polyester, for example, a wholly aromatic polyester that belongs to a thermotropic liquid crystal. The anchoring material 15 injected into the gap between the wall surface of each receptacle 13 and the outer surface of the corresponding permanent magnet 14 solidifies and anchors the permanent magnet 14 inside the receptacle 13.

Structure of Molding Tool 20

The structure of a molding tool 20 used to inject a liquid crystal polymer (liquid crystal polyester) that serves as the anchoring material 15 into the receptacles 13 of the core body 11 will now be described.

Figure 3:
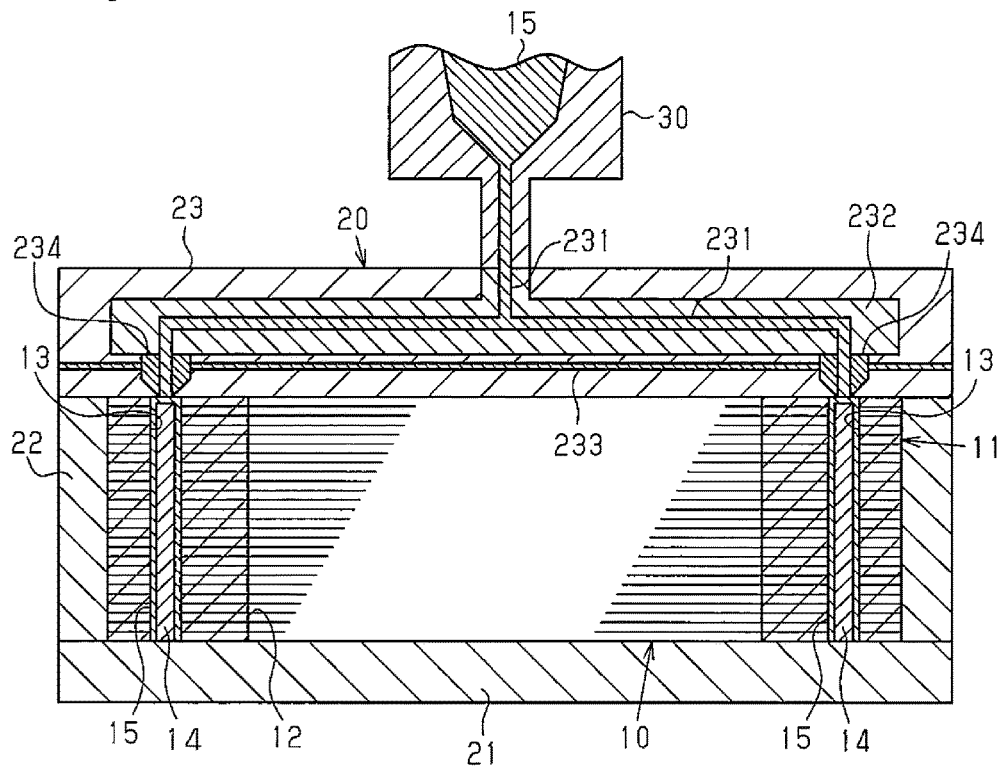
FIG. 3 is a cross-sectional view showing an anchoring material injection step of the manufacturing method.
Figure 4:
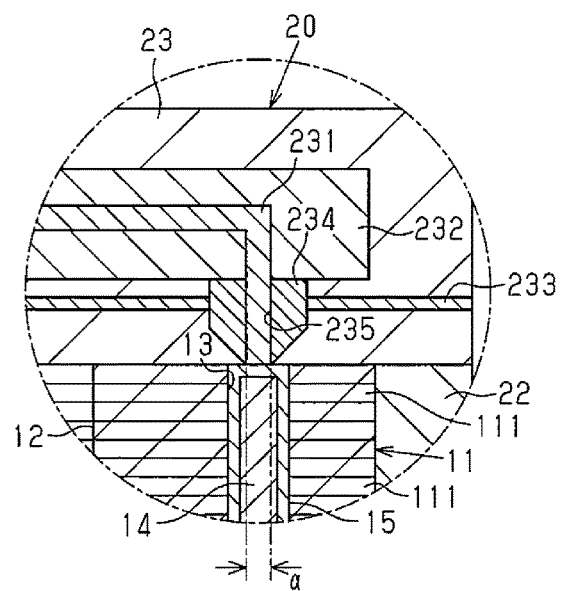
FIG. 4 is a cross-sectional view showing a portion of a molding tool.
Figure 5:
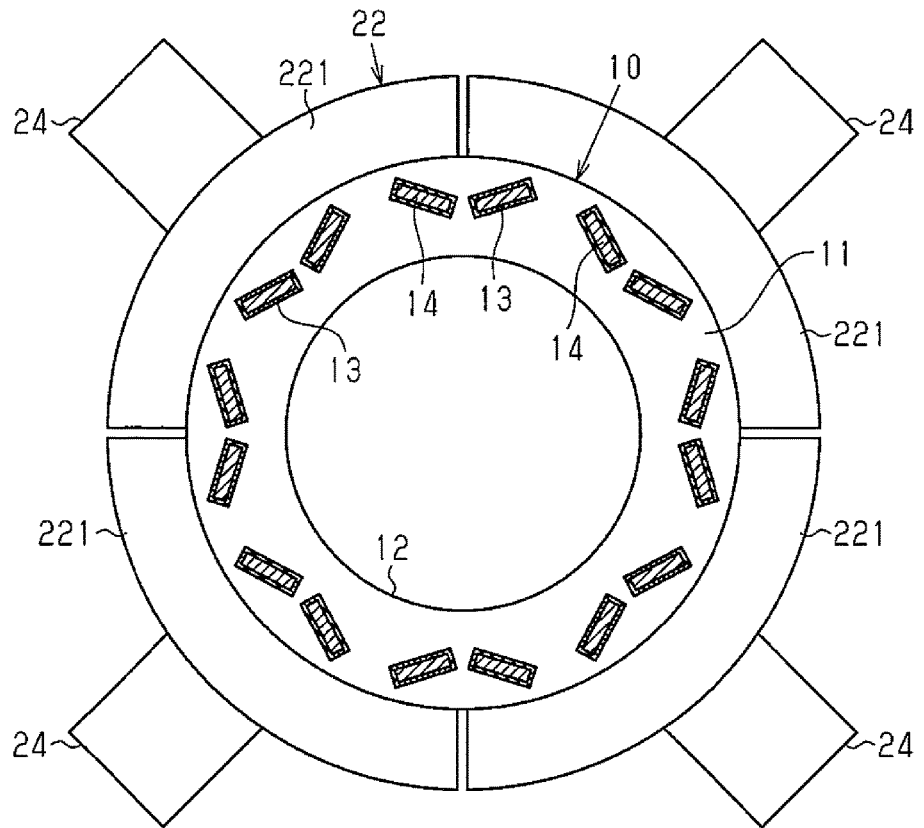
FIG. 5 is a plan view showing the manufacturing method.

As shown in FIGS. 3 and 4, the molding tool 20 includes a base 21, an annular outer frame 22, an upper frame 23, and an injection device 30. The base 21 holds the core body 11. The outer frame 22 encloses the core body 11, which is held on the base 21. The upper frame 23 is joined with the upper surface of the core body 11. As shown in FIG. 5, the outer frame 22 includes a number of segments 221. An actuation device 24 is provided for each segment 221. The actuation device 24 moves the corresponding segment 221 in the radial direction of the core body 11.

Figure 6:
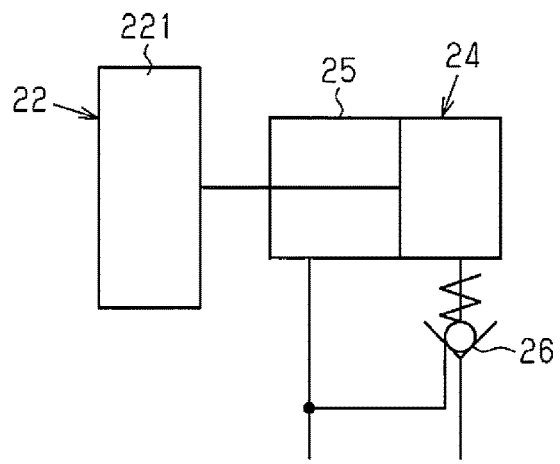
FIG. 6 is a schematic diagram showing an actuation device for the molding tool of FIG. 4.

Referring to FIG. 6, each actuation device 24 includes a hydraulic cylinder 25 and a check valve 26.

As shown in FIGS. 3 and 4, the upper frame 23 includes a passage 231, through which the anchoring material 15 flows in a molten state, a heater 232, and a cooling portion 233, which is located below the heater 232. The passage 231 includes downstream ends respectively corresponding to the receptacles 13. The upper frame 23 includes nozzles 234 respectively arranged at the downstream ends of the passage 231. The nozzles 234 each include a nozzle hole 235 aligned with a corresponding one of the receptacles 13 in the core body 11 on the base 21. Each nozzle hole 235 has a diameter a set to 0.5 to 2.0 mm, preferably, 0.5 to 1.0 mm.

The anchoring material 15, which is formed of liquid crystal polyester, is delivered from the injection device 30 to the passage 231. The anchoring material 15, which is kept hot by the heater 232 in the passage 231, is injected from the nozzle holes 235 into the receptacles 13. The cooling portion 233 blocks the heat from the heater 232 so that most of the heat is not transmitted to the core body 11.

Method for Manufacturing Rotor Core 10

A method for manufacturing the rotor core 10 will now be described.

Figure 7:
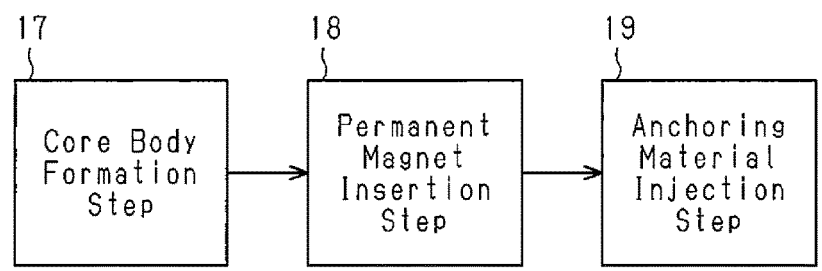
FIG. 7 is a block diagram showing the steps of the rotor core manufacturing method in order.
Figure 8:
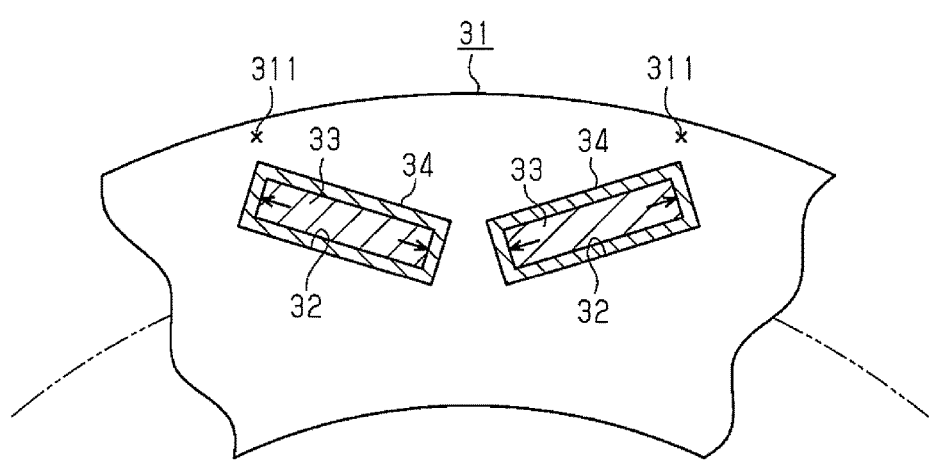
FIG. 8 is a plan view showing a portion of a rotor core manufactured through a conventional manufacturing method.
Figure 9:
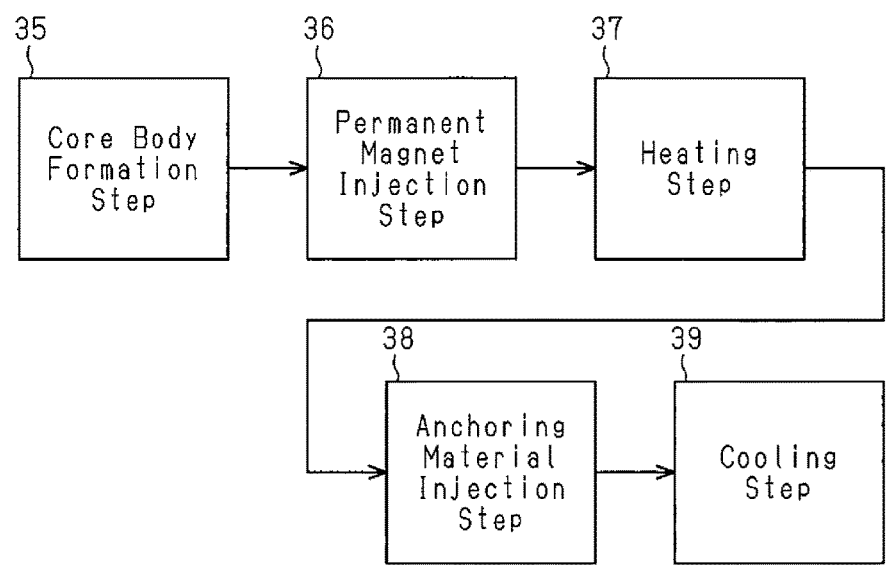
FIG. 9 is a block diagram showing the steps of the conventional manufacturing method.

Referring to FIG. 7, the rotor core 10 is manufactured by performing first to third steps. In the first step 17, the core plates 111 are pressed out of a magnetic body such as a plate of magnetic steel. The core plates 111 are stacked to form the core body 11. In the second step 18, the permanent magnet 14 is inserted into each receptacle 13 of the core body 11. In the third step 19, the molding tool 20 is used to inject the anchoring material 15, which is formed of liquid crystal polymer, into the gap between the wall surface of each receptacle 13 and the outer surface of the corresponding permanent magnet 14. The anchoring material 15 is solidified under room temperature to anchor the permanent magnet 14 in the receptacle 13.

More specifically, in the third step, the core body 11 is arranged in the molding tool 20 on the base 21 enclosed by the outer frame 22. The temperature of the molding tool 20 is maintained at 40 to 80 degrees Celsius, preferably, 40 to 50 degrees Celsius. The core body 11 and the permanent magnets 14 are maintained at the same temperature as the molding tool 20.

The injection device 30 is activated to inject the anchoring material 15, which is in a molten state, into the gap between the wall surface of each receptacle 13 and the outer surface of the corresponding permanent magnet 14. Here, the heater 232 maintains the temperature of the anchoring material 15, which is formed of liquid crystal polymer, at 300 to 380 degrees Celsius. This keeps the viscosity of the anchoring material 15 low and obtains good fluidity. The cooling portion 233 of the upper frame 23 prevents overheating of the core body 11 and maintains the temperature of the core body 11 at 40 to 80 degrees Celsius.

During injection of the anchoring material 15, the melt viscosity of the anchoring material 15, which is formed of liquid crystal polyester, is adjusted to 1.2 to 8.0 pascal-seconds (Pa·s), preferably, 1.2 to 3.5 Pa·s, under a shear velocity of 1000 sec$^{-1}$. It is preferred that the viscosity of the anchoring material 15 be as low as possible, that is, as close as possible to 0 Pa·s. However, such a liquid crystal polymer is presently not available. Thus, the lower limit of the preferred viscosity for the anchoring material 15 is set to 1.2 Pa·s. The anchoring material 15 is injected into the receptacles 13 at a velocity (flow velocity) of 100 to 300 mm/sec, preferably, 150 to 300 mm/sec. Thus, even when the temperature of the core body 11 and the permanent magnets 14 is not high, the viscosity of the anchoring material 15 may be kept low. This allows for the anchoring material 15 to be smoothly injected into the receptacles 13. The viscosity of liquid crystal polymer decreases as the flow velocity increases and increases as the flow velocity decreases.

The pressure applied to the anchoring material 15 when injected out of the injection device 30 is set so that the anchoring material 15 is injected into the receptacles 13 at a pressure of 5 to 30 megapascals (MPa). This properly injects the anchoring material 15 into the receptacles 13.

The liquid crystal polymer used as the anchoring material 15 solidifies even under room temperature. Thus, when the flow of the anchoring material 15 stops in the receptacles 13, the anchoring material 15 solidifies in the core body 11, the temperature of which is 40 to 80 degrees Celsius. Accordingly, there is no need to preheat the core body 11 and the permanent magnets 14 to a high temperature prior to the injection of the anchoring material 15. Further, there is no need to cool the core body 11 and the permanent magnets 14 subsequent to the injection of the anchoring material 15. This simplifies the manufacturing process of the core body 11.

The temperatures of the core body 11 and the permanent magnets 14 are low. Thus, there is no need to cool the core body 11 and the permanent magnets 14 after the injection of the anchoring material 15. However, even if cooling is performed, the cooling time can be reduced and the cooling process can be simplified.

In the manner, the permanent magnets 14 are not heated to a high temperature and do not undergo cooling. Thus, contraction and expansion of the permanent magnets 14 caused by temperature changes practically do not occur. This differs from the prior art in that a large stress does not act in the core body 11 at the thin portions 112 (refer to FIG. 1) and that deformation of the core body 11 is limited at the thin portions 112.

The outer frame 22 of the molding tool 20, which includes the segments 221, is controlled in one of a first mode and a second mode.

In the first mode, the hydraulic cylinders 25 function to arrange the corresponding segments 221 at predetermined positions in the periphery of the core body 11. When the core plates 111 of the core body 11 act to move toward the outer side in the radial direction of the core body 11 and apply force to the segments 221 in the same direction, the check valves 26 act to stop reverse movement of the segments 221. This keeps the core plates 111 stacked when the anchoring material 15 is injected and solidified.

In the second mode, the hydraulic cylinders 25 force the corresponding segments 221 against the outer wall of the core body 11 with a predetermined pressure. This restricts movement of the core plates 111 and keeps the core plates 111 stacked when the anchoring material 15 is injected and solidified.

The present embodiment has the advantages described below.

(1) The permanent magnets 14 are accommodated in the receptacles 13 of the core body 11. The anchoring material 15 is injected into the gap between the wall surface of each receptacle 13 and the outer wall of the corresponding permanent magnet 14. Liquid crystal polymer, more specifically, liquid crystal polyester, which can be solidified under room temperature, is used as the anchoring material 15.

Accordingly, there is no need to heat the rotor core 10 and the permanent magnets 14 to a high temperature prior to the injection of the anchoring material 15. Further, there is no need to cool the rotor core 10 and the permanent magnets 14 subsequent to the injection of the anchoring material 15. Thus, the heating step and the cooling step of the conventional method can be eliminated, and the manufacturing process of the rotor core 10 can be simplified and performed within a shorter period of time. Accordingly, the cycle time can be shortened and energy loss can be reduced when manufacturing the rotor core 10.

(2) The solidification of the liquid crystal polymer differs from curing caused by a chemical reaction, and the liquid crystal polymer quickly solidifies. Thus, the rotor core 10 can be manufactured within a short period of time.

(3) The temperature of the core body 11 is set to 40 to 80 degrees Celsius during the injection of the anchoring material 15. Since the permanent magnets 14 do not have to be heated to a high temperature or cooled from a high temperature, expansion and contraction caused by temperature changes practically do not occur in the permanent magnets 14. This reduces the application of large stresses at the thin portions 112 in the rotor core 10 and limits deformation of the rotor core 10. Accordingly, the rotor core 10 may be obtained with high precision.

Molten liquid crystal polymer is injected into each receptacle 13 of the core body 11 when the core body 11 is enclosed by the outer frame 22. This restricts deformation of the rotor core 10 caused by the injection pressure of the liquid crystal polymer. The outer frame 22 may be omitted as long as the rotor core 10 does not deform.

(4) After the permanent magnets 14 are accommodated in the receptacles 13 of the rotor core 10, the anchoring material 15, which is formed of a liquid crystal polymer, is injected into the gap between the wall surface of each receptacle 13 and the outer surface of the corresponding permanent magnet 14. When the gap is filled with the liquid crystal polymer (anchoring material 15), the melt viscosity of the liquid crystal polymer is adjusted to 1.2 to 8.0 Pa·s. This allows the anchoring material 15 that has a suitable low viscosity to be smoothly injected into the gap between the wall surface of the receptacle 13 and the outer surface of the permanent magnet 14. Accordingly, the permanent magnets 14 may be anchored in the receptacles 13 with sufficient strength for adhesion to the anchoring material 15.

(5) The anchoring material 15 is injected into the receptacles 13 at a velocity of 100 to 300 mm/sec, preferably, 150 to 300 mm/sec. This allows the anchoring material 15 to be injected into receptacles 13 at a suitable flow velocity while maintaining the predetermined melt velocity. Thus, the anchoring material 15 is smoothly and properly injected into the receptacles 13, and the strength adhering the permanent magnets 14 to the anchoring material 15 is increased. In this case, the diameter of the nozzle hole 235 is set to 0.5 to 2.0 mm. This increases the flow velocity of the anchoring material 15 and contributes to smooth injection.

(6) The injection pressure is maintained at 5 to 30 MPa. This allows the anchoring material 15 to have satisfactory injection characteristics and restricts the application of excessive pressure to the core plates 111 and the permanent magnets 14 in the receptacles 13 during injection of the anchoring material 15. Thus, deformation of the core body 11 that would be caused by an excessively high injection pressure is restricted. Further, an increase in surge pressure can be avoided. Surge pressure is produced by kinetic energy that is converted to pressure when the injection of the anchoring material 15 ends. This limits movement of the core plates 111, deformation of the core body 11, and movement of the permanent magnets 14 so that the rotor core 10 can be obtained with high precision.

(7) The segments 221 constrain the outer circumference of the core body 11. This restricts deformation of the core body 11 and movement of the core plates 111 so that the rotor core 10 can be obtained with high precision.

(8) The solidified liquid crystal polymer of the anchoring material 15 has a higher ductility than cured epoxy resin. Thus, cracks formed by physical stress are limited in the anchoring material 15. Further, the core body 11 and the permanent magnets 14 do not have to be heated to a high temperature or be cooled. This limits the expansion and contraction of the gap between the wall surface of each receptacle 13 and the outer surface of the corresponding permanent magnet 14 before and after the injection step of the anchoring material 15. Moreover, the physical stress applied to the solidified anchoring material 15 in the gap is limited. This prevents the formation of cracks in the solidified anchoring material 15. Accordingly, the rotor core 10 obtains the necessary functions. Further, there is no need for a cover that prevents the scattering of fragments when the anchoring material 15 cracks.

(9) The nozzle hole 235 of each nozzle 234 has a small diameter. Thus, the anchoring material 15 passes through the nozzle hole 235 at a high speed. The viscosity of the anchoring material 15 decreases when the flow velocity increases. This allows the anchoring material 15 to be smoothly and properly injected into the receptacles 13. Further, after the anchoring material 15 solidifies, the portion of the anchoring material 15 broken away from the nozzle 234 has a small diameter. Thus, the rotor core 10 may easily be separated from the upper frame 23 with a small torque. Further, the runner gate arranged at the opening of each nozzle hole 235 may be decreased in size. This increases the material yield rate. Further, when the anchoring material 15 leaks from the nozzle hole 235, the amount of leakage can be reduced. Accordingly, material loss of the anchoring material 15 can be reduced. Moreover, the portion that is broken away has a small diameter. Thus, the anchoring material 15 quickly solidifies at the portion that is broken away. This reduces the solidification time and the separation time of the anchoring material 15 and reduces the cycle time for manufacturing the rotor core 10.

The above embodiment may be modified as described below.

The temperature of the core body 11 may be the room temperature when the anchoring material 15 is injected.

Figure 10:
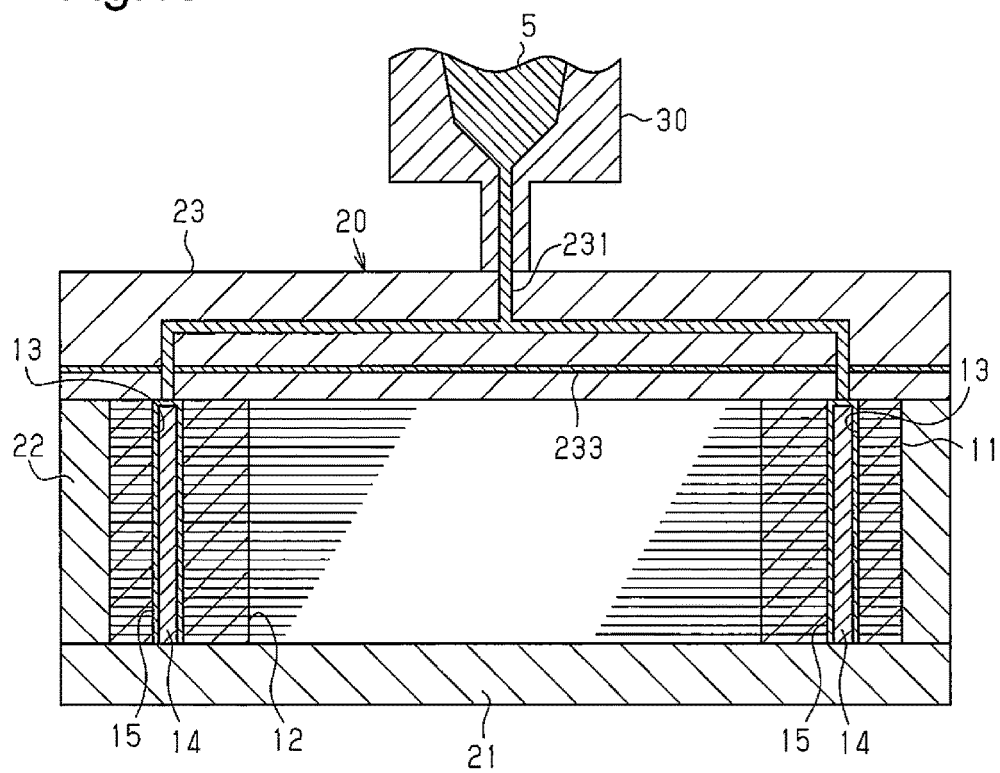
FIG. 10 is a cross-sectional view showing a modified example of the embodiment.

Referring to FIG. 10, the heater 232 in the upper frame 23 of the molding tool 20 may be omitted. In this case, compared with the above embodiment, the temperature of the liquid crystal polymer slightly decreases but has sufficient flow characteristics due to the low viscosity. Further, as shown in FIG. 10, the nozzles 234 of the above embodiment may be omitted, and each downstream end of the passage 231 may be used as a nozzle.

Instead of a rotor core, the manufacturing method of the above embodiment may be applied to a stator core. More specifically, the present invention may be embodied in a method for injecting an anchoring material, which is formed of a liquid crystal polymer, into receptacles of a stator core body. The receptacles accommodate permanent magnets, and the anchoring material is injected into the gap between the wall surface of each receptacle and the corresponding permanent magnet.

The invention claimed is:

1. A method for manufacturing a core of a rotating electric machine, the method comprising:
   providing a core body with a receptacle formed therein,
   arranging a permanent magnet in the receptacle of the core body so as to define a gap between a wall surface of the receptacle and an outer surface of the permanent magnet,
   providing a liquid crystal polymer,
   activating an injection device so that the liquid crystal polymer is delivered from the injection device to a passage,
   injecting the liquid crystal polymer into the gap at a velocity of 100 to 300 millimeters per second when the core body and the permanent magnet each have a temperature from 40 to 80 degrees Celsius, and
   allowing the liquid crystal polymer to solidify, thereby anchoring the permanent magnet to the core body, wherein
   the liquid crystal polymer is injected into the gap from a nozzle hole of a nozzle arranged at a downstream end of the passage, and
   a diameter of the nozzle hole is set to 0.5 to 2.0 mm.

2. The method according to claim 1, further comprising injecting the liquid crystal polymer into the receptacle under a pressure of 5 to 30 megapascals.

3. The method according to claim 1, further comprising injecting the liquid crystal polymer into the gap when the liquid crystal polymer has a melt viscosity of 3.5 pascal-seconds or less.

* * * * *